United States Patent [19]
Lee et al.

[11] Patent Number: 5,731,936
[45] Date of Patent: Mar. 24, 1998

[54] MAGNETORESISTIVE (MR) SENSOR WITH COEFFICIENT ENHANCING THAT PROMOTES THERMAL STABILITY

[75] Inventors: Wen Yaung Lee; Daniele Mauri, both of San Jose, Calif.

[73] Assignee: International Business Machines Corporation, Armonk, N.Y.

[21] Appl. No.: 721,642

[22] Filed: Sep. 26, 1996

[51] Int. Cl.$^6$ ........................................... G11B 5/39
[52] U.S. Cl. ........................................... 360/113
[58] Field of Search ................................. 360/113

[56] References Cited

U.S. PATENT DOCUMENTS

| | | | |
|---|---|---|---|
| 3,814,863 | 6/1974 | O'Day et al. | 360/113 |
| 3,967,368 | 7/1976 | Brock et al. | 29/603 |
| 4,879,619 | 11/1989 | Fontana, Jr. et al. | 360/113 |
| 5,258,884 | 11/1993 | Howard et al. | 360/113 |
| 5,268,806 | 12/1993 | Goubau et al. | 360/113 |
| 5,341,118 | 8/1994 | Parkin et al. | 338/32 |
| 5,341,261 | 8/1994 | Dieny et al. | 360/113 |
| 5,447,781 | 9/1995 | Kano | 360/113 |

Primary Examiner—A. J. Heinz
Attorney, Agent, or Firm—Baker, Maxham, Jester & Meador

[57] ABSTRACT

An MR sensor with an improved MR coefficient and improved thermal stability is provided by employing one or more chromium based spacer layers which are interfacially adjacent a Permalloy (NiFe) stripe. The chromium based spacer layers may be NiFeCr or NiCr. The best compositions have been found to be $(Ni_{89}Fe_{21})_{60}Cr_{40}$ and $Ni_{60}Cr_{40}$. For NiCr the MR coefficient of the MR stripe is most enhanced when the NiCr layer is deposited on a layer of tantalum (Ta). Further, when the thicknesses of the NiFeCr and the NiCr layers are 25 Å and 50 Å respectively the MR coefficients are optimized. Both spacer layers have a high resistance compatible with low shunting of the sense current.

65 Claims, 6 Drawing Sheets

MAGNETORESISTIVE (MR) SENSOR WITH COEFFICIENT ENHANCING THAT PROMOTES THERMAL STABILITY

BACKGROUND OF THE INVENTION

1. Field of the Invention

The present invention relates to a magnetoresistive (MR) sensor with an MR enhancing layer, and more particularly to an MR sensor with a seedlayer and/or one or more spacer layers which enhance the MR coefficient of the MR sensor.

2. Description of the Related Art

A magnetoresistive (MR) sensor is employed in an MR read head for sensing magnetic fields on a magnetic storage medium, such as a rotating magnetic disk. The MR read head is carried on a slider mounted on a suspension, the suspension, in turn, being mounted to an actuator. The suspension biases the slider toward a surface of the disk. When the disk rotates, the loading is counterbalanced by a cushion of air (an "air bearing") generated by the rotating disk. The slider is supported on the air bearing by an air bearing surface (ABS). The actuator moves the head to selected information tracks on the rotating magnetic disk. The resistance of an MR stripe in the MR sensor changes in proportion to changes of the intensities of magnetic fields emanating from the rotating disk. When a sense current is conducted through the MR sensor, the resistance changes in the MR stripe cause proportional changes in potential across the sensor. These potential changes are then processed to produce playback signals corresponding to the information signals stored on the magnetic disk.

A typical anisotropic MR (AMR) sensor includes a biasing layer, a spacer layer, an MR stripe and a cap layer. The biasing layer is employed for transversely biasing the MR stripe. The spacer layer provides magnetic separation between the MR stripe and the biasing layer. The cap layer is provided to protect the MR stripe from oxidation. The resistance of the MR stripe to the sense current is dependent upon the angle between the direction of the sense current and the direction of the magnetic moment of the sensor. In a longitudinal MR sensor the length of the sensor is parallel to the slider's ABS. The easy axis of the MR stripe and the direction of the sense current are also parallel to the ABS. When an external field reaches the MR sensor, the orientation of the magnetic moment is rotated with respect to the ABS, changing the resistance of the MR stripe. The stripe's resistance is at a minimum when the magnetic moment of the MR stripe is perpendicular to the ABS. Since external fields can rotate the magnetic moment clockwise and counterclockwise, a graph of resistance versus applied field will exhibit a bell shaped curve. When the MR stripe is transversely biased by the biasing layer, the magnetic moment of the MR stripe is located along a linear portion of the bell shaped curve. With this arrangement the magnetic moment of the MR stripe is at approximately 45 degrees to the ABS in a quiescent state (no applied field). When fields are applied from a rotating disk a transversely-biased MR stripe will exhibit a linear response. The change in resistance of the MR stripe due to the applied field is denoted by $\Delta R$, and the ratio $\Delta R/R$ is termed the MR coefficient of the MR stripe.

As is known, the magnetic design of recording systems with high linear densities (Gbit/in$^2$) dictates the requirement for very thin MR sensing layers. However, this requirement forces the MR thickness into a range of a strongly reduced MR coefficient.

Typically, an MR stripe is fabricated from a NiFe based alloy. For example, the alloy can be Permalloy, which is $Ni_{89}Fe_{21}$, or NiFeCo. Bulk Permalloy has an MR coefficient of about 4%. For a very thin Permalloy stripe, such as 150 Å, as is roughly required for a 1 Gbit/in$^2$ head, the MR coefficient drops to about 2%. There is a strong felt need to enhance the MR coefficient of very thin MR stripes to meet the demand for higher density MR read heads.

A well accepted approach for increasing the MR coefficient by improving the microstructure of a thin film MR stripe is to expose the MR stripe to a high temperature, such as 350°–500° C., either during or after deposition of the MR sensor. With this heat treatment, the reduction of resistivity and increase in the MR coefficient have been on the order of 50%. However, heat treatment cannot be employed when reactive layers are adjacent the MR stripe. For instance, when a Permalloy MR stripe is heated to 350°–500° C. on a Ta underlayer, the Permalloy reacts with Ta losing some of its magnetic moment and strongly reducing the MR coefficient. Further, the high heat can be destructive to other layers, such as shield layers.

Ta is widely employed as a seedlayer for a Permalloy MR stripe. When the Permalloy is grown on a Ta seedlayer, the resistance of the Permalloy is reduced and there is a corresponding increase in the MR coefficient of 20% to 25%. Ta is also desirable because it has high resistivity which minimizes shunting of the sense current. It also has fair thermal stability which dictates the maximum allowable level of the sense current. Further, Ta has a zero moment, as required for any layer adjacent the MR stripe. Accordingly, Ta has been employed as seedlayer, spacer layer and/or capping layer in MR sensors.

We have postulated that if a NiFe based alloy could be employed as a seedlayer for the Permalloy MR stripe, the microstructure of the MR stripe might be enhanced to produce a high MR coefficient. Furthermore, such an alloy may be less reactive with NiFe than Ta at elevated temperatures. It is understood that such a seedlayer, although containing Ni and Fe, should have no magnetic moment. The seedlayer should also be compatible with a a zero or a slightly negative NiFe magnetostriction and with a NiFe anisotropy field between 3–6 Oe. It would also be desirable if the seedlayer would be compatible with the use of an amorphous CoX layer for transverse biasing.

SUMMARY OF THE INVENTION

We have discovered that when $Ni_{48}Fe_{12}Cr_{40}$ is employed as a seedlayer, the MR coefficient of a Permalloy MR stripe is increased 25% to 30% over a Ta seedlayer. Further, the thermal stability is increased so that the sense current can be increased. A $Ni_{60}Cr_{40}$ seedlayer can also be employed, either alone or grown on a Ta layer. If the $Ni_{60}Cr_{40}$ seedlayer is on Ta, the MR coefficient can be 30% larger than for Ta by itself. The $Ni_{48}Fe_{12}Cr_{40}$ layer or the $Ni_{60}Cr_{40}$ layer can be employed as a seedlayer, spacer layer or a capping layer. When the layer is employed as a seedlayer or a spacer layer it will be referred to as a spacer layer which abuts the MR stripe. When the MR layer is grown on the spacer layer the spacer layer serves as a seedlayer as well as a spacer layer; when the spacer layer is grown on the MR stripe it serves as only a spacer layer. The concentration of Cr in the alloy is within a fairly narrow range of 20% to 50%, with the best concentration being about 40%. In this range the alloys examined had zero magnetic moment.

Tests have shown that a Permalloy MR stripe grown on a spacer layer of $Ni_{48}Fe_{12}Cr_{40}$ results in a significantly improved grain structure. The improvement is manifested by in much larger grains with fewer defects. It is believed that this improved grain structure significantly contributes to increasing the MR coefficient of the MR stripe.

An object of the present invention is to provide a spacer layer adjacent an MR stripe which enhances the MR coefficient and the thermal stability of the MR stripe, when compared to a Ta spacer layer.

Another object is to provide a spacer layer adjacent an MR stripe which is similar in metallic content to the material of the MR stripe, yet has zero magnetic moment.

Other objects and advantages of the invention will become apparent by referring to the following description and accompanying drawings.

DETAILED DESCRIPTION OF THE PREFERRED EMBODIMENTS

Figure 1:
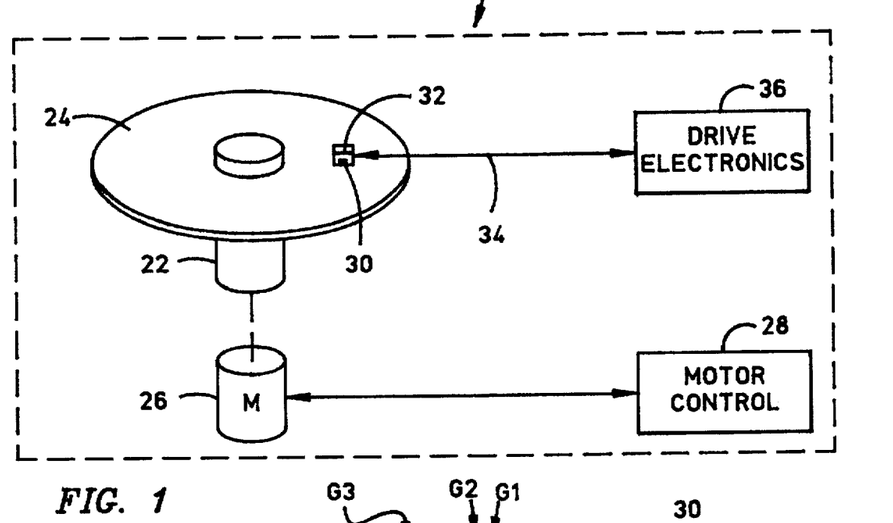
FIG. 1 is an isometric schematic illustration of a magnetic disk drive which employs an exemplary merged MR head with an improved MR sensor of the present invention.

Referring now to the drawings wherein like reference numerals designate like or similar parts throughout the several views, there is illustrated in FIG. 1 a disk drive 20. The drive 20 includes a spindle 22 which supports and rotates at least one magnetic disk 24. The spindle 22 is rotated by a motor 26 which is governed by a motor controller 28. A thin film magnetic head 30 of the present invention is mounted on a slider 32, the slider being supported by a suspension and actuator arm 34. The suspension and actuator arm 34 position the slider 32 so that the head 30 is in a transducing relationship with a surface of the magnetic disk 24. When the disk 24 is rotated by the motor 26, air is moved by the surface of the disk, causing the slider to ride on an air bearing slightly off the surface, on the order of 0.075 microns. The head 30 is then employed for writing information to multiple circular tracks on the surface of the disk 24 as well as reading information therefrom. Signals for reading and writing this information are exchanged with the head 30 and are processed by drive electronics 36, which also processes servo signals for controlling the position of the slider with respect to the disk, and for driving the motor to rotate the disk.

Figure 2:
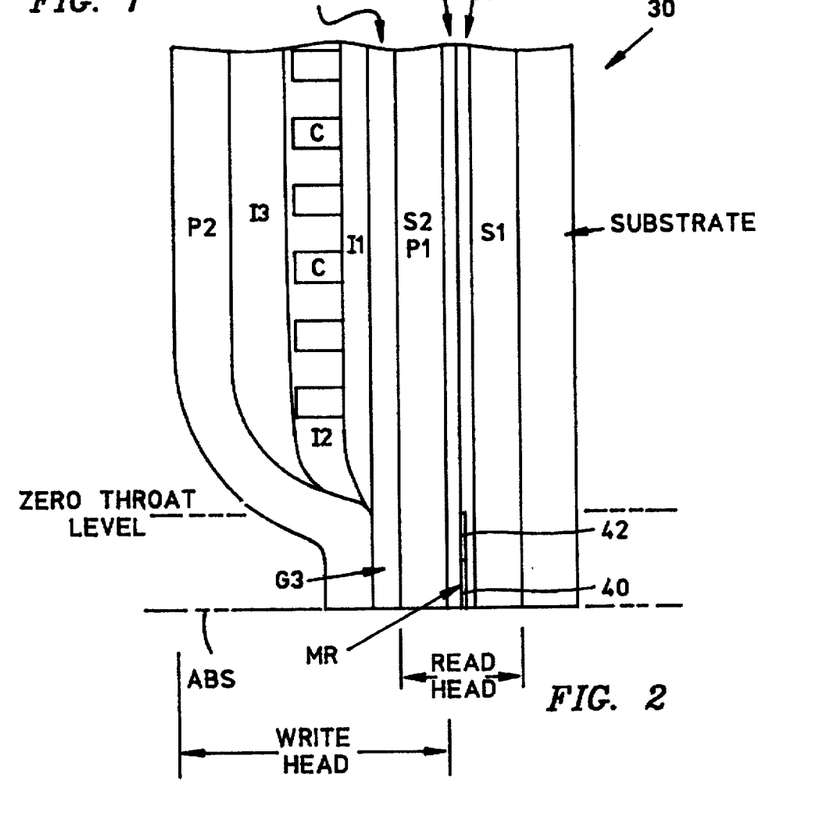
FIG. 2 is a schematic vertical cross-sectional view of the exemplary merged MR head with the improved MR sensor of the present invention.

FIG. 2 is a cross-sectional schematic illustration of the head 30 which includes a read head portion and a write head portion. The head 30 is lapped to form an air bearing surface (ABS), the ABS being spaced from the surface of the rotating disk by the air bearing, as discussed hereinabove. The read head portion includes a magnetoresistive (MR) sensor 40 sandwiched between first and second gap layers G1 and G2 which are, in turn, sandwiched between first and second shield layers S1 and S2. The write head portion includes a coil layer C and insulation layer I2 which are sandwiched between insulation layers I1 and I3 which are, in turn, sandwiched between first and second pole pieces P1 and P2. A gap layer G3 is sandwiched between the first and second pole pieces at their pole tips adjacent the ABS for providing a magnetic gap. When signal current is conducted through the coil layer C, flux is induced into the first and second pole piece layers P1 and P2 causing flux to fringe across the pole tips at the ABS. This flux magnetizes circular tracks on the rotating disk 24, shown in FIG. 1, during a write operation. During a read operation, flux in magnetized regions on the rotating disk bathes the MR sensor of the read head, causing resistance changes in the MR sensor. Sensor resistance changes are detected by detecting changes of a sense voltage across the MR sensor. The voltage changes are processed by the drive electronics 36 shown in FIG. 1. The combined head illustrated in FIG. 2 is a "merged" MR head in which the second shield layer S2 of the read head is employed as a first pole piece P1 for the write head. In a piggyback head (not shown) the second shield layer S2 and the first pole piece P1 are separate layers.

Figure 3:
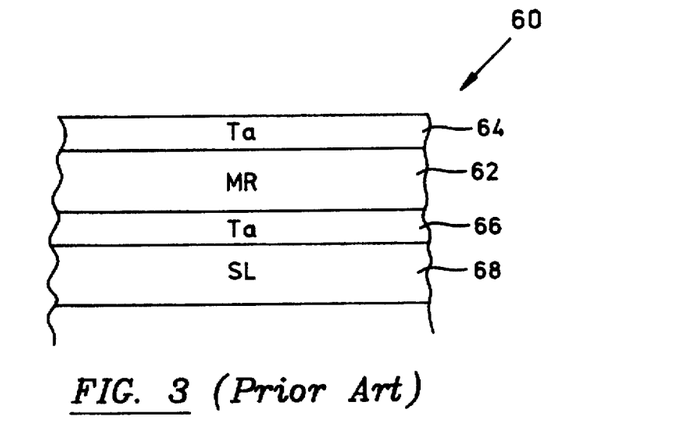
FIG. 3 is a cross-sectional view of the layers of a prior art MR sensor.

FIG. 3 illustrates a prior art MR sensor 60 which includes a Permalloy MR stripe 62 sandwiched between top and bottom Ta layers 64 and 66, the bottom Ta layer being on a soft layer 68 for transverse biasing. Tantalum (Ta) is the most widely used underlayer material for an MR stripe 62 because Ta improves the MR coefficient of the Permalloy MR stripe by enhancing its grain structure. Further, Ta has high resistivity and good thermal stability relative to other elements. The negative effects of Ta occur at the interface of the Ta underlayer with the Permalloy MR stripe. High heat at the Ta and Permalloy interface causes an interdiffusion therebetween, which destroys the magnetic moment of the MR stripe.

Figure 4A:
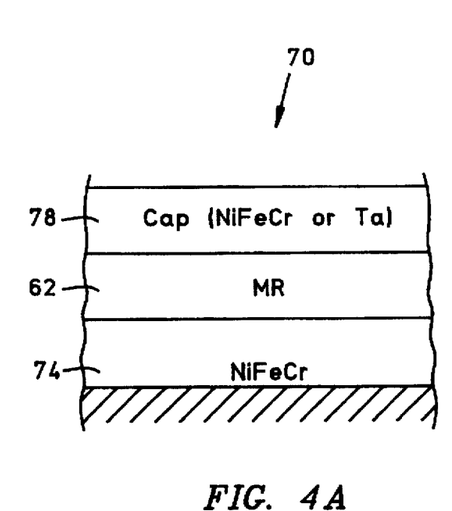
FIG. 4A is a cross-sectional view of the layers of a first embodiment of the MR sensor without a soft biasing layer.
Figure 4B:
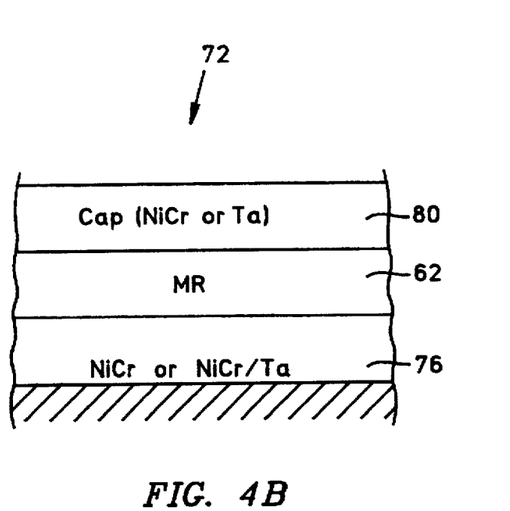
FIG. 4B is a cross-sectional view of the layers of a second embodiment of the MR sensor without the soft biasing layer.

FIGS. 4A and 4B show improved MR sensors 70 and 72 according to the present invention. We have discovered that, by employing a layer 74 of NiFeCr or a layer 76 of NiCr immediately adjacent the Permalloy stripe 62, the MR coefficient and the thermal stability of the MR sensor are significantly improved over the prior art MR sensor 60 shown in FIG. 3. As shown in FIG. 4A, a capping layer 78 of NiFeCr or Ta may be employed the capping layer being an outermost layer of the MR sensor. The NiFeCr capping layer provides better thermal stability of the MR sensor 70 than the Ta capping layer. In FIG. 4B the capping layer 80 may be NiCr or Ta. The NiCr capping layer provides a better thermal stability of the MR sensor 72 than the Ta capping layer. In FIGS. 4A and 4B it should be noted that no soft layer (SL) has been employed for transverse biasing the MR stripe 62. In some embodiments the soft layer is not required since transverse biasing may be obtained by other means such as the barber pole scheme as shown in U.S. Pat. No. 4,052,728.

Figure 5A:
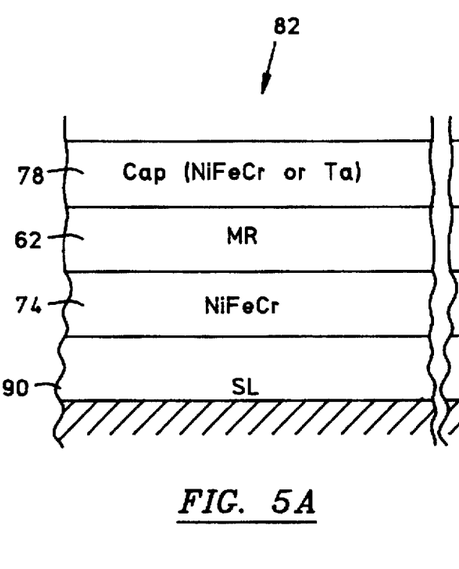
FIG. 5A is a cross-sectional view of the layers of the first embodiment of the MR sensor with a soft biasing layer.
Figure 5B:
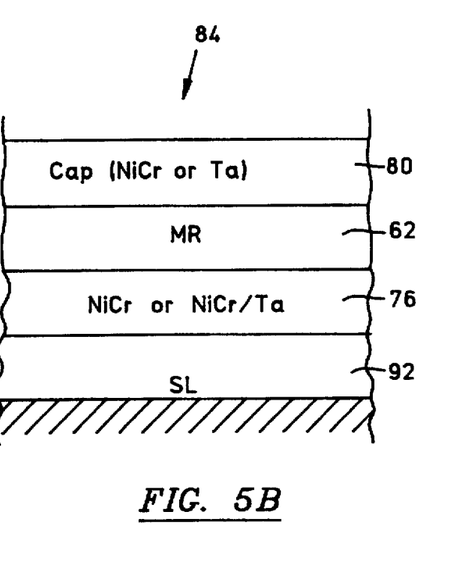
FIG. 5B is a cross-sectional view of the layers of the second embodiment of the MR sensor with a soft biasing layer.

FIGS. 5A and 5B show embodiments 82 and 84 of the present invention which are similar to the embodiments 70 and 72, shown in FIGS. 4A and 4B, respectively except the embodiments 82 and 84 have soft layers 90 and 92 below the chromium based layers 74 and 76 for transversely biasing the MR stripe 62. The soft layer may be NiFeNb, CoNbFe, NiFeCr or others.

Figure 6A:
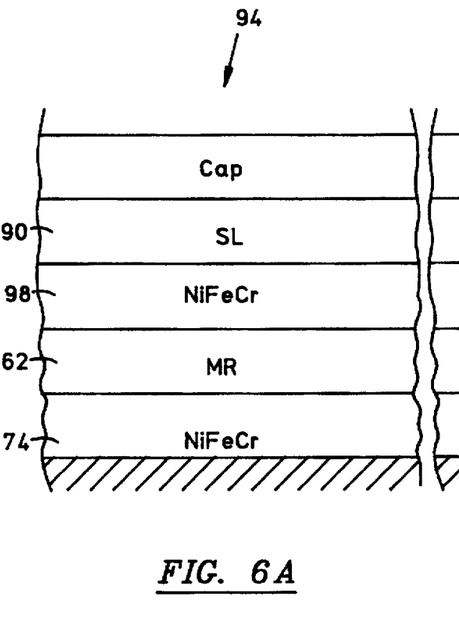
FIG. 6A is a cross-sectional view of the layers of the first embodiment of the MR sensor with the soft biasing layer above the MR stripe.
Figure 6B:
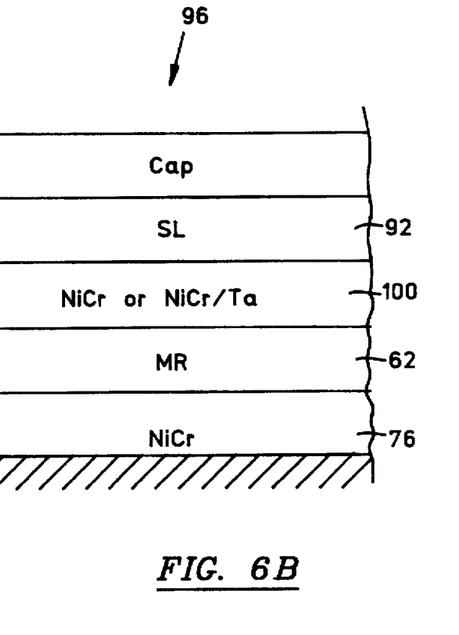
FIG. 6B is a cross-sectional view of the layers of a second embodiment of the MR sensor with the soft biasing layer above the MR stripe.

In FIGS. 6A and 6B there are shown embodiments 94 and 96 of the present invention wherein the MR stripe 62 is sandwiched between NiFeCr layers 74 and 98 in FIG. 6A and between NiCr layers 76 and 100 in FIG. 6B and the soft biasing layers 90 and 92 are above the MR stripe 62. When the MR stripe 62 is sandwiched between chromium based layers, as shown in FIGS. 6A and 6B, the MR sensor has improved thermal stability.

It should be noted that the NiFeCr layer 98 in the embodiment 94 and the NiCr layer 100 in the embodiment 96 serve as spacer layers between the MR stripe 62 and the soft layers 90 and 92. The chromium based layers 74 and 76 in FIGS. 4A, 5A and 6A serve as an underlayer or seedlayer for the construction of the MR stripes 62. Further, the chromium based layers 74 and 76 serve as a spacer layer between the MR stripe and underlying substrates. As an example, the chromium based layers 74 and 76 in the embodiments in FIGS. 5A and 5B serve as a spacer layer between the MR stripes 62 and the underlying soft layers 90 and 92. Accordingly, when the chromium based layers are interfacially adjacent the MR stripe 62, they will be referred to hereinafter as spacer layers unless they are specifically referred to as a capping layer. It should be noted that the NiCr layers can be combined with a Ta layer which we have discovered will further increase the MR coefficient of the MR stripe. The description hereinbelow will explain the results from various experiments conducted to show the advantages of the present invention over the prior art MR sensor shown in FIG. 3.

Figure 7:
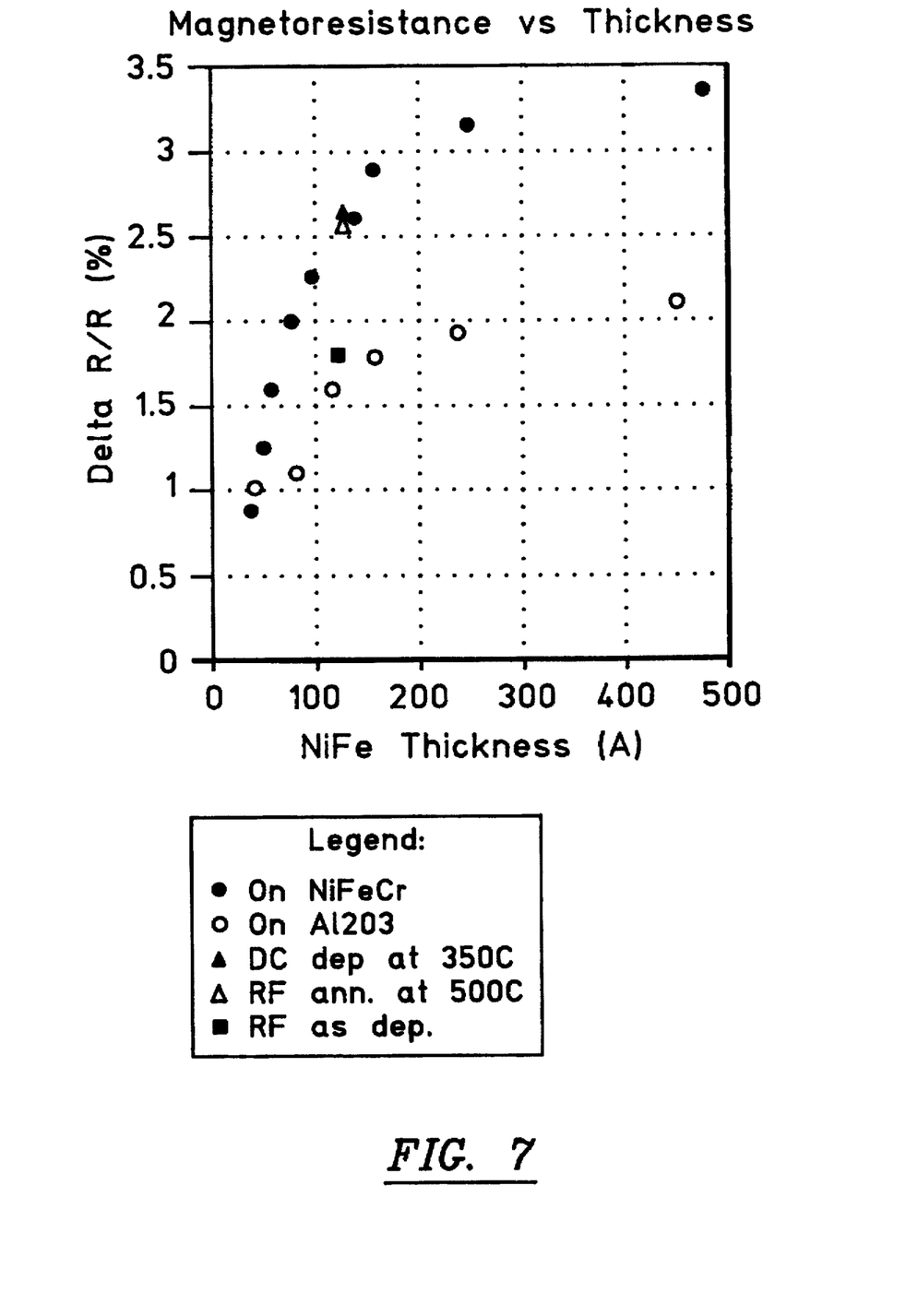
FIG. 7 is a graph illustrating the MR coefficient ($\Delta R/R$) in percent versus thickness of a Permalloy ($Ni_{81}Fe_{19}$) layer in angstroms on various underlayers deposited under various conditions.

FIG. 7 shows the results from experiments wherein various thicknesses of Permalloy ($Ni_{81}Fe_{19}$) are deposited on various underlayers of $Ni_{48}Fe_{12}Cr_{40}$ and alumina ($Al_2O_3$) with various sputtering techniques. The results are shown in MR coefficients versus thicknesses of the Permalloy. The filled circles correspond to Permalloy thin film layers grown on a 50 Å underlayer of $(Ni_{81}Fe_{19})_{60}Cr_{40}$. Codeposition from a $Ni_{81}Fe_{19}$ target and a pure Cr target was implemented to form the $(Ni_{81}Fe_{19})_{60}Cr_{40}$ layer followed by deposition only from the $Ni_{81}Fe_{19}$ target to form the Permalloy layer on top of the chromium based layer. The filled squares correspond to Permalloy deposited by DC sputtering directly on an alumina layer. Manifestly the Permalloy deposited on the chromium based layer shown by the filled circles has significantly increased MR coefficients over the Permalloy deposited on the alumina layer shown by the filled squares. The hollow square shows Permalloy sputtered by a DC magnetron at 350° C. on alumina. It can be seen that the result obtained is equivalent to the Permalloy layer deposited on the chromium based layer shown by the filled circles at low heat. The filled diamond corresponds to RF sputtering of a Permalloy layer on alumina and subsequently annealed at 500° C. Again, the one data point for this experiment shows an equivalent MR coefficient for the Permalloy as Permalloy deposited on the chromium based layers shown by the filled circles. The hollow diamond corresponds to RF sputtering of the Permalloy layer on an alumina layer at high heat. It can be seen from this data point that when high heat is employed the MR coefficient is low. These experiments demonstrate that equivalent MR coefficients can be obtained with Permalloy deposited on $(Ni_{81}Fe_{19})_{60}Cr_{40}$ at low heat as that obtained from Permalloy deposited on alumina at high heat during or after deposition. The advantage of depositing the Permalloy layer on the chromium based layer under low heat conditions prevents interfacial reactions between the layers and damage to other layers such as shield layers. When tantalum is interfaced with Permalloy high heat causes a reaction at the interface which severely reduces the magnetic moment and the magneto-resistance of the MR stripe.

| Underlayer Concentration Dependence NiFe[1 − x]—Cr[x] (50Å)/NiFe (80Å)/NiFe [50%] Cr [50%] | |
|---|---|
| Cr | dR/R (%) |
| 30% | 1.7 |
| 40% | 1.8 |
| 50% | 1.1 |

The above chart shows the results of MR coefficients for three different concentrations of chromium NiFeCr and a capping layer of NiFeCr deposited on the Permalloy layer. The deposition was made by DC magnetron sputtering. When the chromium concentration is 30% the MR coefficient in the Permalloy layer is 1.7%. When the chromium content is increased to 40% the MR coefficient Permalloy layer is 1.8% and when the chromium concentration is increased to 50% the MR coefficient drops to 1.1%. This chart shows that the best concentration of chromium in the NiFeCr layer is around 40%.

It is important that the non-magnetic layers in an MR sensor have high resistivity in order to limit shunting of the sense current. The resistivity of the NiFeCr layer on a 1000 Å thick film ranges from 120 micro-ohms per centimeter for a 30% chromium concentration to 150 micro-ohms per centimeter for a 50% chromium concentration.

Tests were run to determine the effect of the NiFeCr seedlayer on magnetostriction of the Permalloy layers. The NiFeCr seedlayer causes only a minor shift of the magnetostriction toward more negative values as compared to a Ta seedlayer.

| Thermal Stability IB NiFe Nb (102Å)/x/NiFe (150Å)/x | | |
|---|---|---|
| | Ta spacer (x) | NiFeCr spacer (x) |
| As dep. | 1.94% | 2.44% |
| 250° C. × 7 h | 1.98% | 2.49% |
| +350° C. × 7 h | 1.45% | 2.38% |

The chart shown hereinabove shows the thermal stability of the MR sensor at various temperatures for Ta spacer layers and NiFeCr spacer layers. A spacer layer is deposited on a 102 Å thick soft layer of NiFeNb, a 150 Å thick Permalloy (NiFe) layer is deposited on the spacer layer and another spacer layer is deposited on top of the Permalloy layer. The deposition was by ion beam sputtering. The MR coefficients are shown for the various combinations. The NiFeCr spacer layer shows an MR coefficient of 2.44% as compared to 1.94% for a Ta spacer layer when no heat is applied to the layers. When the layers are heated at 250° C. for seven hours the results do not change much, showing the MR coefficient for the NiFeCr spacer layer at 2.49% and the MR coefficient for the Ta spacer layer at 1.98%. However, when the layers are subjected to heat at 350° C. for seven hours the MR coefficient has declined slightly for the Cr spacer layer and the MR coefficient has declined dramatically for the Ta spacer layer. The Permalloy thickness equivalent loss when 350° C. heat applied results in a 4 Å thickness loss for the NiFeCr spacer layer and a 35 Å thickness loss for the Ta spacer layer. A 35 Å Permalloy equivalent thickness loss is unacceptable. Accordingly, the NiFeCr spacer layer provides improved thermal stability over the Ta spacer layer for an MR sensor.

Figure 8:
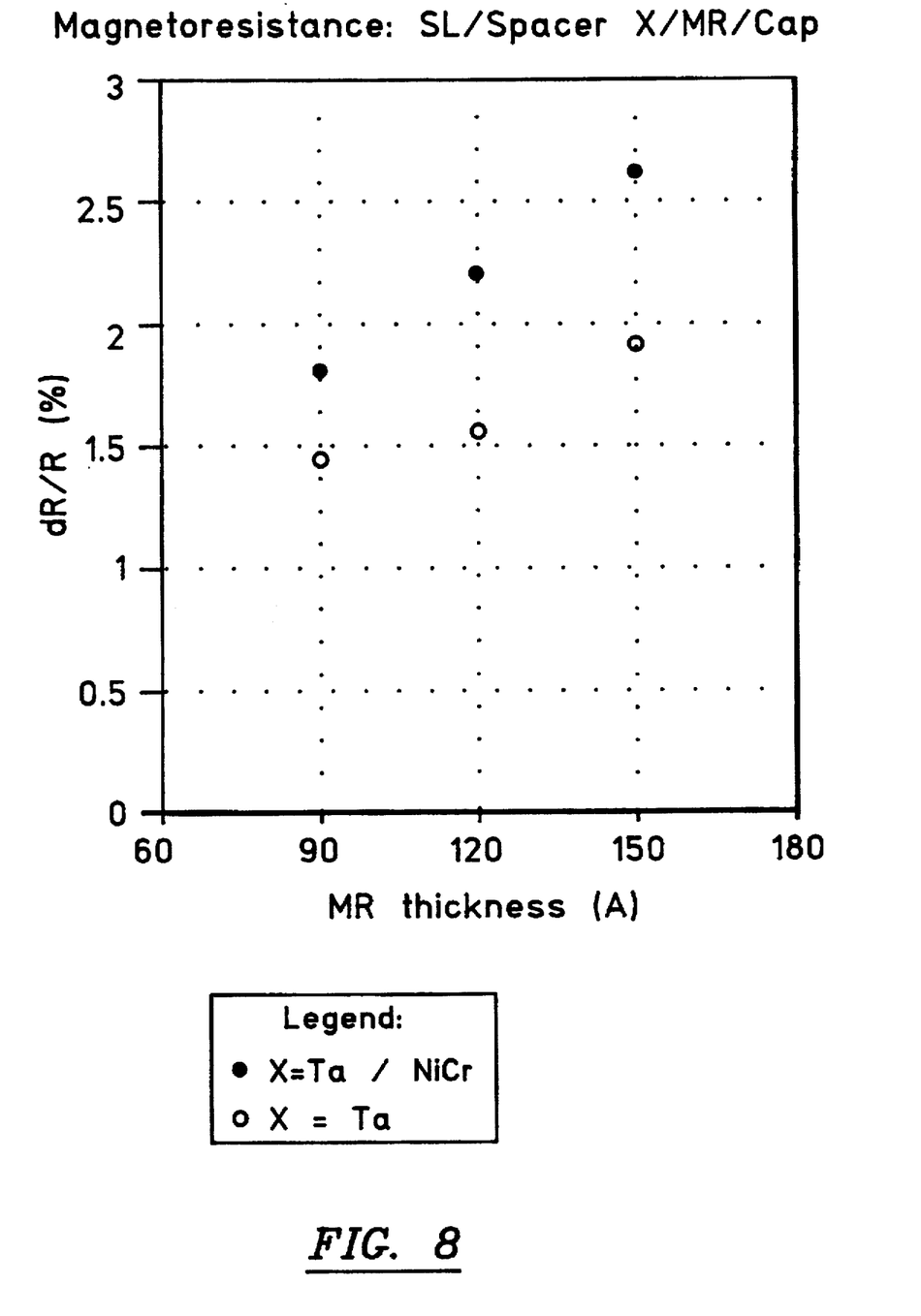
FIG. 8 is a graph illustrating MR coefficients in percentages versus various thicknesses of an MR stripe comparing prior art results with results obtained by the present invention.

FIG. 8 shows the improvement of the MR coefficients for MR sensors with various thicknesses employing the NiCr spacer compared to prior art MR sensors employing Ta layers. The ratio of the soft layer (SL) to the MR stripe thickness is kept constant in all cases. The open circles show the MR coefficients for prior art heads at these various thicknesses. The filled circles show the MR coefficients for MR heads employing the NiCr spacer layers. From this chart it can be seen that there is a significant improvement in MR sensors which employ the NiCr spacer layer as compared to the prior art MR sensors which employ the Ta spacer layers.

Figure 9:
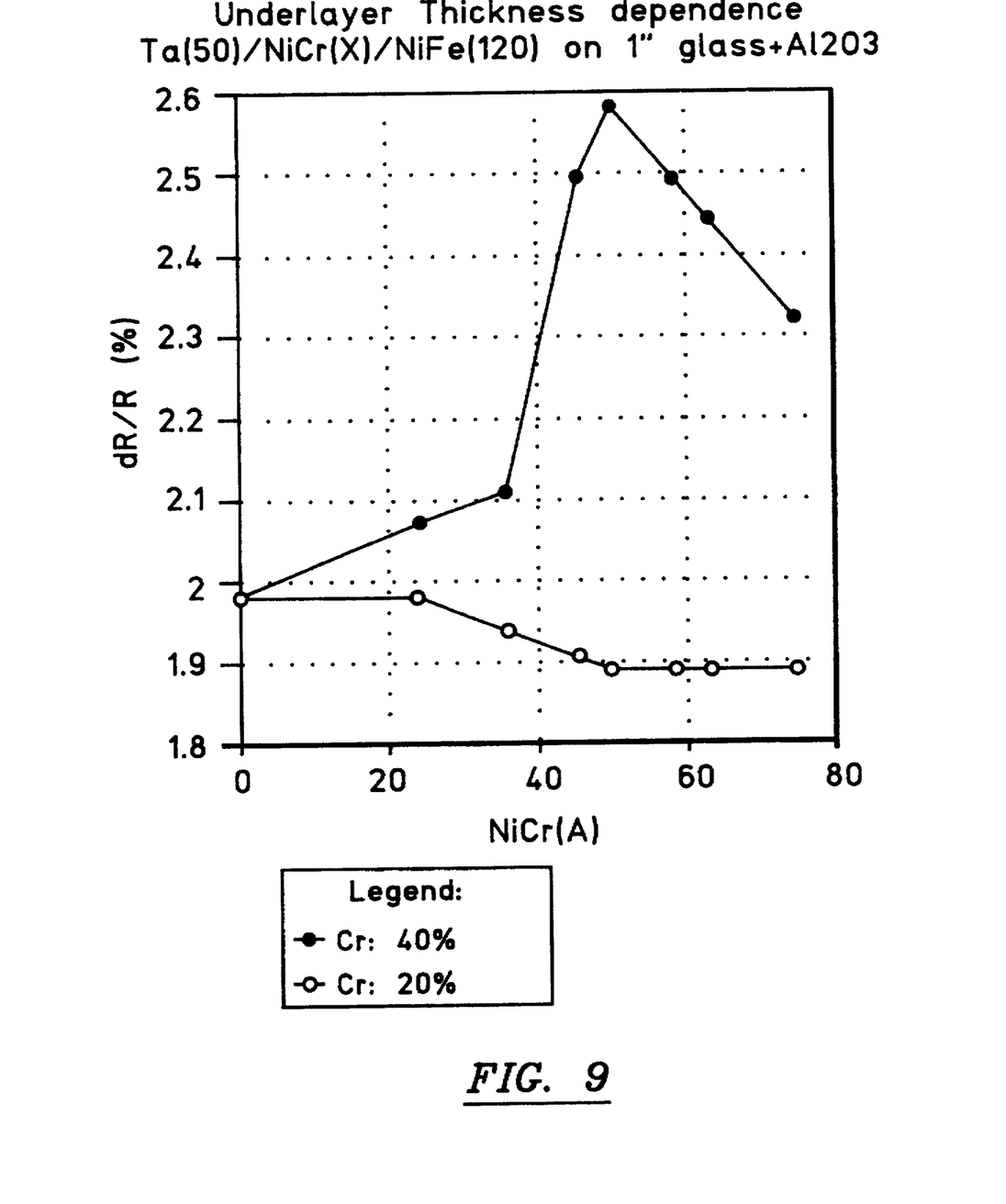
FIG. 9 is a graph showing MR coefficients versus various thicknesses of a NiCr underlayer for 20% and 40% concentrations of chromium.

FIG. 9 shows the various MR coefficients for 120 Å of Permalloy (NiFe) deposited on various thicknesses of NiCr layers which are, in turn, deposited on 50 Å of Ta for 20% and 40% chromium concentrations. The depositions were made by RF sputtering. This chart shows a very high MR coefficient for a 50 Å NiCr layer with a chromium concentration of 40%. When the chromium concentration is dropped to 20% the MR coefficients are significantly lower.

The aforementioned NiFeCr and NiCr layers are generally interchangeable for an improved MR sensor. The maximum MR coefficient in the MR stripe is obtained when the concentration of the chromium in the spacer layer is about 40%. However, the maximum MR coefficient is obtained at various seedlayer thicknesses, depending on the alloy or the deposition process. The maximum MR coefficient enhancement is obtained at about 25 Å of NiFeCr by ion beam sputtering, whereas the maximum is obtained by about 50 Å for the NiCr layer as shown in FIG. 9. The overall improvement of the MR coefficient in the 150 Å MR stripe employing the present invention as compared to a Ta underlayer is about 30%. The signal enhancement for a 150 Å MR head with SL biasing is approximately 20%. As shown by the previous charts, there is improved thermal stability of the MR sensor at 350° C. and above. This will allow the sense current to be at a higher level which will improve the efficiency of the head. Further, the present invention is compatible with Co based amorphous soft layers which are used for transversely biasing the MR stripe.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetoresistive (MR) sensor comprising:

an MR stripe including NiFe; and a first spacer layer including a zero magnetic moment $Ni_xFe_yCr_z$ alloy that interfaces the MR stripe, where x, y and z are percentages of Ni, Fe and Cr respectively; and the x, y and z percentages being selected to optimize an MR coefficient and thermal stability of the MR stripe.

2. An MR read head including the MR sensor of claim 1 wherein the read head comprises:

first and second gap layers;

the MR sensor being sandwiched between the first and second gap layers;

first and second shield layers; and the first and second gap layers being sandwiched between the first and second shield layers.

3. A combined MR read head and inductive write head including the MR read head of claim 2, the combined head comprising:

an inductive coil embedded in an insulation stack;

the insulation stack and the inductive coil being sandwiched between first and second pole pieces; and the first and second pole pieces being spaced by a third gap layer at an air bearing surface.

4. A magnetic disk drive including the combined head as claimed in claim 3, the drive comprising:

a frame;

a magnetic disk rotatably supported in the frame;

a support mounted on the frame for supporting the combined head in a transducing relationship with the magnetic disk;

means for rotating a magnetic disk;

positioning means connected to the support for moving the head to multiple positions with respect to said magnetic disk; and means connected to the head, to the means for rotating the magnetic disk, and to the positioning means for exchanging signals with the combined head, for controlling movement of the magnetic disk and for controlling the position of the combined head.

5. An MR sensor as claimed in claim 1 wherein the first spacer layer has a thickness that maximizes the MR coefficient of the MR stripe.

6. An MR sensor as claimed in claim 1 wherein y is greater than zero.

7. An MR sensor as claimed in claim 6 including:

a soft magnetic layer interfacing with the first spacer layer, the first spacer layer being sandwiched between the soft magnetic layer and the MR stripe.

8. An MR sensor as claimed in claim 7 wherein the soft magnetic layer is $NiFeX$ where X is a material selected from the group consisting of Cr, Nb and Rh.

9. An MR sensor as claimed in claim 7 wherein the soft magnetic layer consists of a magnetic amorphous alloy containing Co.

10. An MR sensor as claimed in claim 1 wherein y is zero.

11. An MR sensor as claimed in claim 10 including:

a soft magnetic layer interfacing with the first spacer layer, such that the first spacer layer is sandwiched between the soft magnetic layer and the MR stripe.

12. An MR sensor as claimed in claim 11 wherein the soft magnetic layer is $NiFe_X$ where X is a material selected from the group consisting of Cr, Nb and Rh.

13. An MR sensor as claimed in claim 11 wherein the soft magnetic layer consists of a magnetic amorphous alloy containing Co.

14. An MR sensor as claimed in claim 10 including:

a second spacer layer including $Ni_xFe_yCr_z$ and interfacing with the MR stripe, such that the MR stripe is sandwiched between the first and second spacer layers; and a soft magnetic layer interfacing with the second spacer layer, such that the second spacer layer is sandwiched between the MR stripe and the soft magnetic layer.

15. An MR sensor as claimed in claim 14 wherein the soft magnetic layer is NiFeX where X is a material selected from the group consisting of Cr, Nb and Rh.

16. An MR sensor as claimed in claim 14 wherein the soft magnetic layer consists of a magnetic amorphous alloy containing Co.

17. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; and the z percentage being 50% or less.

18. An MR read head including the MR sensor of claim 17 wherein the read head comprises:

first and second gap layers:

the MR sensor being sandwiched between the first and second gap layers;

first and second shield layers; and the first and second gap layers being sandwiched between the first and second shield layers.

19. A combined MR read head and inductive write head including the MR read head of claim 18, the combined head comprising:

an inductive coil embedded in an insulation stack;

the insulation stack and the inductive coil being sandwiched between first and second pole pieces; and the first and second pole pieces being spaced by a third gap layer at an air bearing surface.

20. A magnetic disk drive including the combined head as claimed in claim 19, the drive comprising:

a frame;

a magnetic disk rotatably supported in the frame;

a support mounted on the frame for supporting the combined head in a transducing relationship with the magnetic disk;

means for rotating a magnetic disk;

positioning means connected to the support for moving the head to multiple positions with respect to said magnetic disk; and means connected to the head, to the means for rotating the magnetic disk, and to the positioning means for exchanging signals with the combined head, for controlling movement of the magnetic disk and for controlling the position of the combined head.

21. An MR sensor as claimed in claim 17 including:

a soft magnetic layer interfacing with the first spacer layer, the first spacer layer being sandwiched between the soft magnetic layer and the MR stripe.

22. An MR sensor as claimed in claim 21 wherein the soft magnetic layer is NiFeX where X is a material selected from the group consisting of Cr, Nb and Rh.

23. An MR sensor as claimed in claim 21 wherein the soft magnetic layer consists of a magnetic amorphous alloy containing Co.

24. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; and the z percentage being in the range of 20%–50%.

25. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; and the x percentage being substantially 40%.

26. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; and the x percentage being substantially 48%, the y percentage being substantially 12% and the z percentage being substantially 40%.

27. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; and the y percentage being greater than zero;

a soft magnetic layer interfacing with the first spacer layer, the first spacer layer being sandwiched between the soft magnetic layer and the MR stripe;

a capping layer that is an outermost layer of the MR sensor; and the capping layer being selected from the group consisting of NiFeCr, Ta, NiCr, NiCr/Ta and Ta/NiCr.

28. An MR sensor as claimed in claim 27 wherein the soft magnetic layer is NiFeX where X is a material selected from the group consisting of Cr, Nb and Rh.

29. An MR sensor as claimed in claim 27 wherein the soft magnetic layer consists of a magnetic amorphous alloy containing Co.

30. An MR sensor as claimed in claim 27 wherein x is substantially 48%, y is substantially 12% and z is substantially 40%.

31. An MR read head including the MR sensor of claim 30 wherein the read head comprises:

first and second gap layers:

the MR sensor being sandwiched between the first and second gap layers;

first and second shield layers; and the first and second gap layers being sandwiched between the first and second shield layers.

32. A combined MR read head and inductive write head including the MR read head of claim 31, the combined head comprising:

an inductive coil embedded in an insulation stack;

the insulation stack and the inductive coil being sandwiched between first and second pole pieces; and the first and second pole pieces being spaced by a third gap layer at an air bearing surface.

33. A magnetic disk drive including the combined head as claimed in claim 32, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk, and to the positioning means for exchanging signals with the combined head, for controlling movement of the magnetic disk and for controlling the position of the combined head.

34. An MR sensor as claimed in claim 30 wherein the capping layer includes NiFeCr.

35. An MR sensor as claimed in claim 30 wherein the capping layer includes Ta.

36. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively;

a second spacer layer including $Ni_xFe_yCr_z$ interfacing the MR stripe, such that the MR stripe is sandwiched between the first and second spacer layers;

a soft magnetic layer interfacing with the second spacer layer, such that the second spacer layer is sandwiched between the MR stripe and the soft magnetic layer; and the x percentage being substantially 48%, the y percentage being substantially 12% and the z percentage being substantially 40%.

37. An MR sensor as claimed in claim 36 wherein the soft magnetic layer is $NiFe_X$ where X is a material selected from the group consisting of Cr, Nb and Rh.

38. An MR sensor as claimed in claim 36 wherein the soft magnetic layer consists of a magnetic amorphous alloy containing Co.

39. An MR sensor as claimed in claim 36 including:

a capping layer that is an outermost layer of the MR sensor; and the capping layer interfacing the soft magnetic layer, such that the soft magnetic layer is sandwiched between the second spacer layer and the capping layer.

40. An MR sensor as claimed in claim 39 wherein the capping layer is composed of material selected from the group consisting of NiFeCr, Ta, NiCr, NiCr/Ta and Ta/NiCr.

41. An MR sensor as claimed in claim 40 wherein x is substantially 48%, y is substantially 12% and z is substantially 40%.

42. An MR read head including the MR sensor of claim 41 wherein the read head comprises:

first and second gap layers:

the MR sensor being sandwiched between the first and second gap layers;

first and second shield layers; and the first and second gap layers being sandwiched between the first and second shield layers.

43. A combined MR read head and inductive write head including the MR read head of claim 42, the combined head comprising:

an inductive coil embedded in an insulation stack;

the insulation stack and the inductive coil being sandwiched between first and second pole pieces; and the first and second pole pieces being spaced by a third gap layer at an air bearing surface.

44. A magnetic disk drive including the combined head as claimed in claim 43, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk, and to the positioning means for exchanging signals with the combined head, for controlling movement of the magnetic disk and for controlling the position of the combined head.

45. An MR sensor as claimed in claim 41 wherein the capping layer includes NiFeCr.

46. An MR sensor as claimed in claim 41 wherein the capping layer includes Ta.

47. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; and the y percentage is zero;

a soft magnetic layer interfacing the first spacer layer, such that the first spacer layer is sandwiched between the soft magnetic layer and the MR stripe;

a capping layer that is an outermost layer of the MR sensor; and the capping layer being composed of material selected from the group consisting of NiFeCr, Ta, NiCr, NiCr/Ta and Ta/NiCr.

48. An MR sensor as claimed in claim 47 wherein the soft magnetic layer being NiFeX where X is a material selected from the group consisting of Cr, Nb and Rh.

49. An MR sensor as claimed in claim 47 wherein the soft magnetic layer consists of a magnetic amorphous alloy containing Co.

50. An MR sensor as claimed in claim 47 wherein x is substantially 60% and z is substantially 40%.

51. An MR read head including the MR sensor of claim 50 wherein the read head comprises:

first and second gap layers:

the MR sensor being sandwiched between the first and second gap layers;

first and second shield layers; and the first and second gap layers being sandwiched between the first and second shield layers.

52. A combined MR read head and inductive write head including the MR read head of claim 51, the combined head comprising:

an inductive coil embedded in an insulation stack;

the insulation stack and the inductive coil being sandwiched between first and second pole pieces; and the first and second pole pieces being spaced by a third gap layer at an air bearing surface.

53. A magnetic disk drive including the combined head as claimed in claim 52, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk, and to the positioning means for exchanging signals with the combined head, for controlling movement of the magnetic disk and for controlling the position of the combined head.

54. An MR sensor as claimed in claim 50 wherein the capping layer includes NiCr.

55. An MR sensor as claimed in claim 50 wherein the capping layer includes Ta.

56. A magnetoresistive (MR) sensor comprising:

an MR stripe including NiFe;

a first spacer layer including a zero magnetic moment $Ni_xFe_yCr_z$ alloy that interfaces the MR stripe, where x, y and z are percentages of Ni, Fe and Cr respectively; the y percentage being zero;

a second spacer layer including $Ni_xFe_yCr_z$ and interfacing the MR stripe, such that the MR stripe is sandwiched between the first and second spacer layers;

a soft magnetic layer interfacing the second spacer layer, such that the second spacer layer is sandwiched between the MR stripe and the soft magnetic layer;

a capping layer that is an outermost layer of the MR sensor; and the capping layer interfacing the soft magnetic layer such that the soft magnetic layer is sandwiched between the second spacer layer and the capping layer.

57. An MR sensor as claimed in claim 56 wherein the soft magnetic layer is NiFeX where X is a material selected from the group consisting of Cr, Nb and Rh.

58. An MR sensor as claimed in claim 56 wherein the soft magnetic layer consists of a magnetic amorphous alloy containing Co.

59. An MR sensor as claimed in claim 56 wherein the capping layer is composed of material selected from the group consisting of NiFeCr, Ta, NiCr, NiCr/Ta and Ta/NiCr.

60. An MR sensor as claimed in claim 59 wherein x is substantially 60% and z is substantially 40%.

61. An MR read head including the MR sensor of claim 60 wherein the read head comprises:

first and second gap layers;

the MR sensor being sandwiched between the first and second gap layers;

first and second shield layers; and the first and second gap layers being sandwiched between the first and second shield layers.

62. A combined MR read head and inductive write head including the MR read head of claim 61, the combined head comprising:

an inductive coil embedded in an insulation stack;

the insulation stack and the inductive coil being sandwiched between first and second pole pieces; and the first and second pole pieces being spaced by a third gap layer at an air bearing surface.

63. A magnetic disk drive including the combined head as claimed in claim 62, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk, and to the positioning means for exchanging signals with the combined head, for controlling movement of the magnetic disk and for controlling the position of the combined head.

64. An MR sensor as claimed in claim 60 wherein the capping layer includes NiCr.

65. An MR sensor as claimed in claim 60 wherein the capping layer includes Ta.

* * * * *